UNITED STATES PATENT OFFICE.

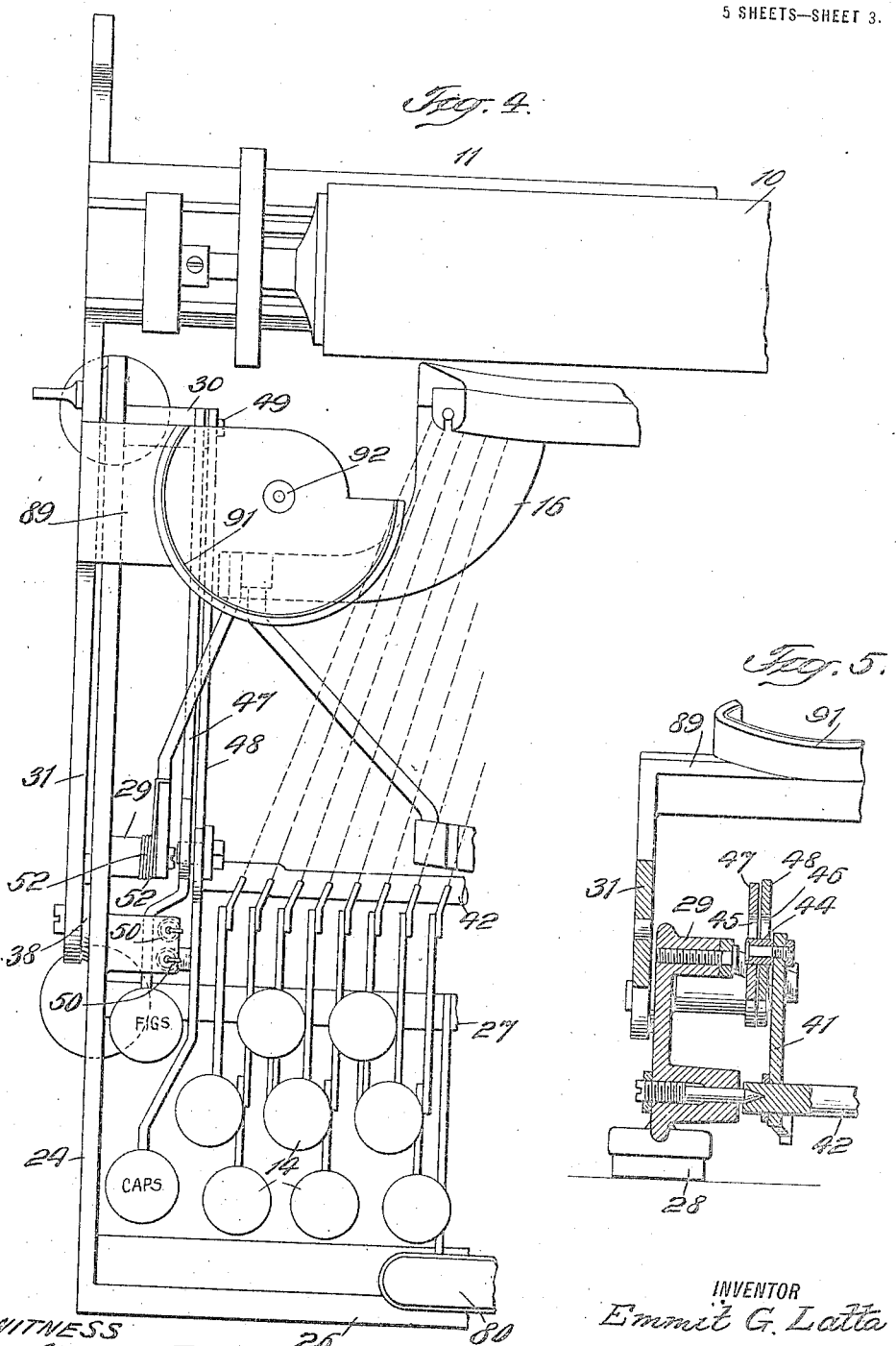

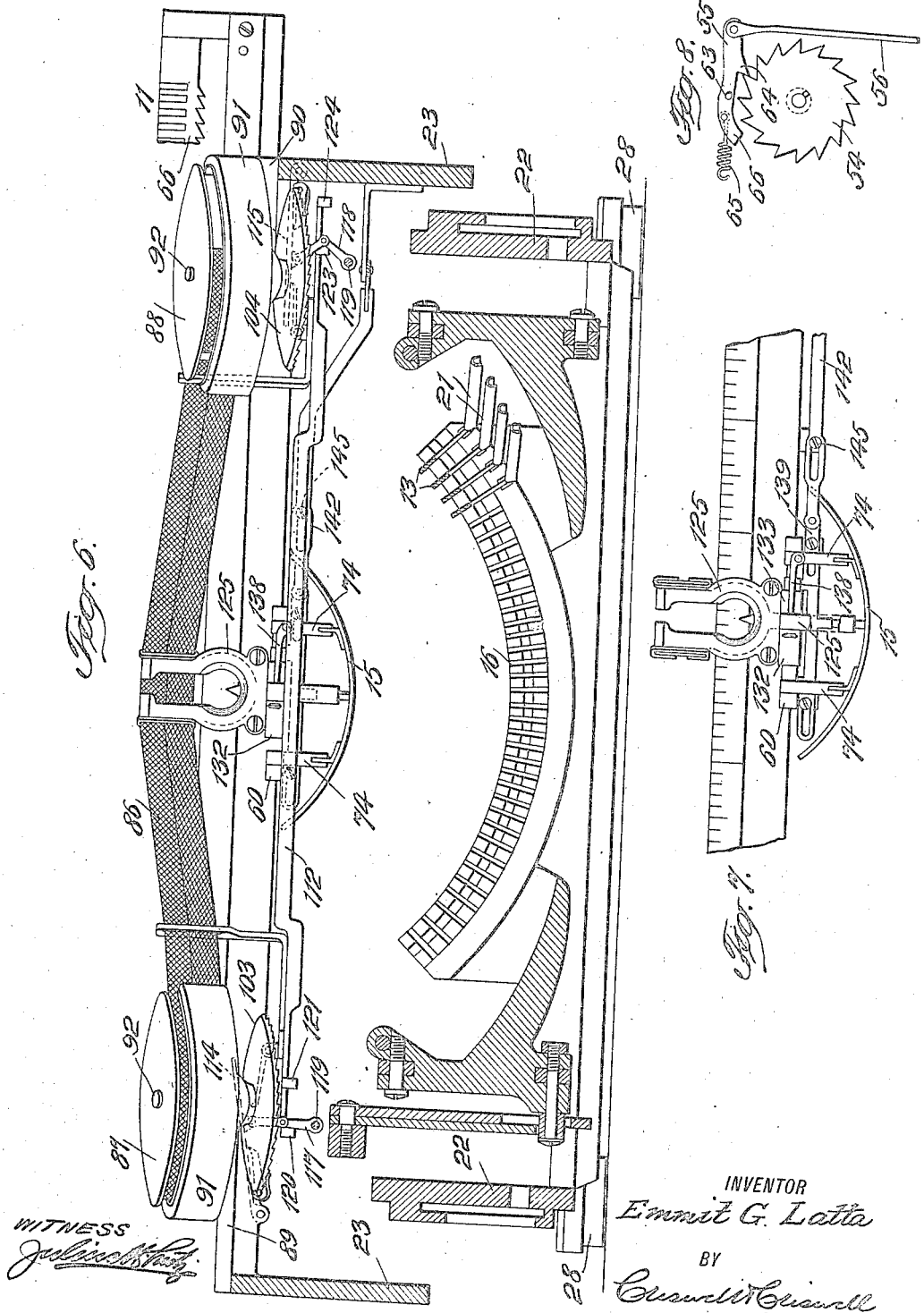

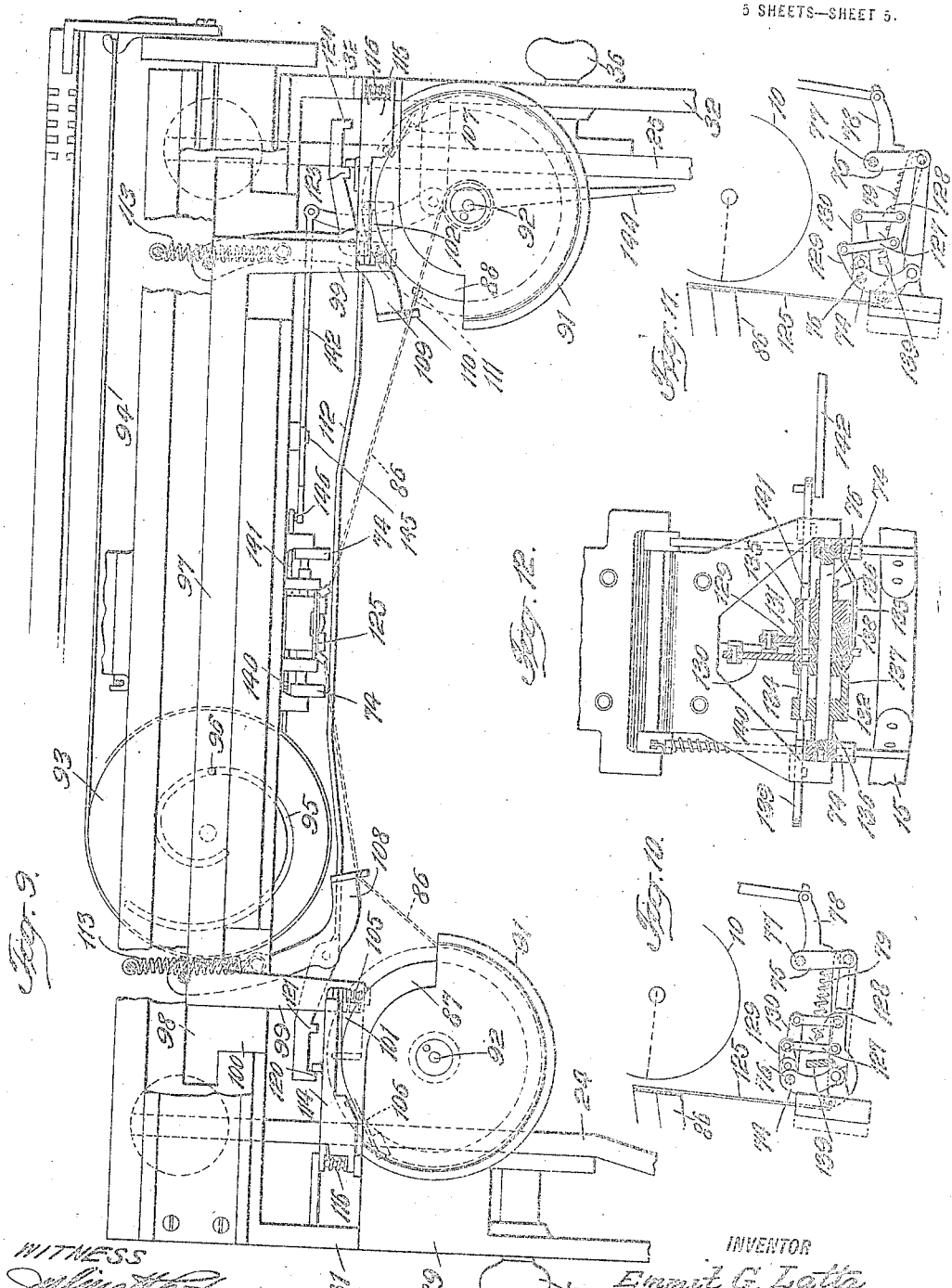

EMMIT G. LATTA, OF SYRACUSE, NEW YORK, ASSIGNOR TO CORONA TYPEWRITER COMPANY, INC., A CORPORATION OF NEW YORK.

TYPE-WRITING MACHINE.

1,222,423.　　　　　Specification of Letters Patent.　　Patented Apr. 10, 1917.

Application filed April 1, 1916. Serial No. 88,287.

*To all whom it may concern:*

Be it known that I, EMMIT G. LATTA, a citizen of the United States, and a resident of Syracuse, county of Onondaga, and State of New York, have invented certain new and useful Improvements in Type-Writing Machines, of which the following is a full, clear, and exact description.

This invention relates to improvements in portable typewriting machines, and has for its object to provide a thoroughly practical and desirable front strike or visible writing typewriter which is of a novel construction adapting it to be readily collapsed into a small compact form, such that it can be conveniently shipped and carried from place to place.

In a copending application Serial No. 658,153, filed Nov. 2, 1911, is disclosed a collapsible front strike typewriting machine equipped with the various devices necessary for it to perform all of the functions demanded of the larger and more expensive typewriters of the most approved and up-to-date design. The present application shows another way of accomplishing substantially like results, in which, however, the collapsible frame is composed of slidably connected parts or sections, instead of the hinged construction disclosed in said application. The machine herein described, when collapsed, is materially shorter from front to rear but in the particular form shown is somewhat higher, than said other machine. In this application is also shown a case shifting mechanism and space key mechanism which differ from the corresponding mechanisms shown in said prior application, but the remaining features of said other machine can be used in the present machine practically without change.

In the accompanying drawings consisting of five sheets:

Fig. 4 is a fragmentary plan thereof.

Fig. 5 is a transverse sectional elevation in line V—V, Fig. 1.

Fig. 6 is a vertical transverse section taken forward of the type bar segment and the ribbon spools, parts of the carriage being either broken away or not shown.

Fig. 7 is a fragmentary front elevation of the ribbon vibrating mechanism.

Fig. 8 is a fragmentary elevation of a part of the escapement mechanism.

Fig. 9 is a fragmentary plan of a part of the machine showing the ribbon reversing mechanism.

Fig. 10 shows the ribbon vibrating mechanism in position to use the upper field of the ribbon.

Fig. 11 shows the ribbon vibrating mechanism in position to use the lower field of the ribbon; and Fig. 12 is a fragmentary section showing the means for operating the vibrator to impart different throws to the ribbon or to permit the ribbon to remain inactive for stenciling purposes.

Like reference characters refer to like parts in the several figures.

Figure 1:
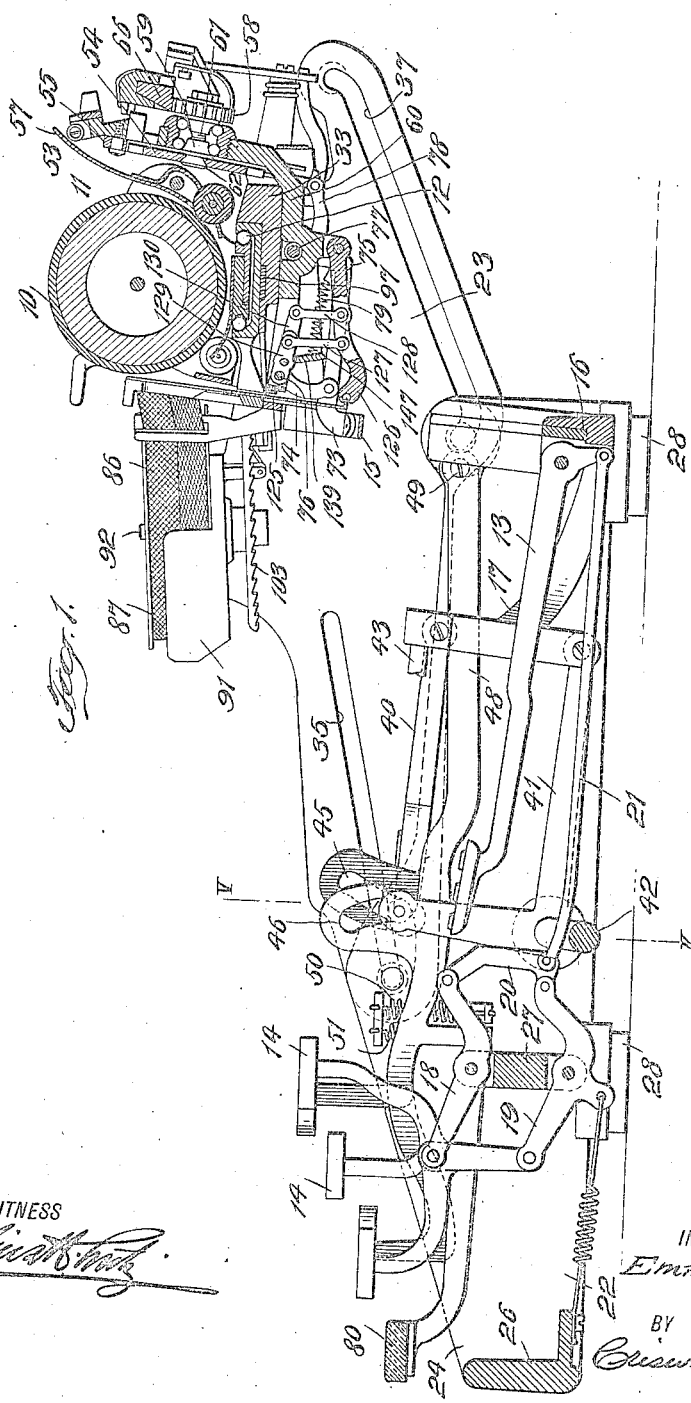
Figure 1 is a fragmentary longitudinal sectional elevation of a collapsible typewriting machine, embodying the invention, showing the parts in operative position.

10 represents the platen, 11 the platen carriage, 12 the ball bearing guide on which the carriage travels transversely of the machine, 13 one of the type-bars. 14 the finger keys for actuating the type-bars, and 15 the universal bar. The type-bars 13 are suitably pivoted, to swing upwardly and rearwardly to the platen, on a segment 16 which is supported by a shift frame 17 which is movable for placing any one of the three sets of characters on the type-bars in printing relation to the platen. Each of the finger keys 14 is supported by a pair of levers 18 and 19 which are connected by links 20 and 21 to one of the type-bars. When one of the keys 14 is depressed its coöperating levers 18 and 19 and links 20 and 21 will force one of the type of a type-bar upwardly against the work sheet about the platen 10.

Figure 2:
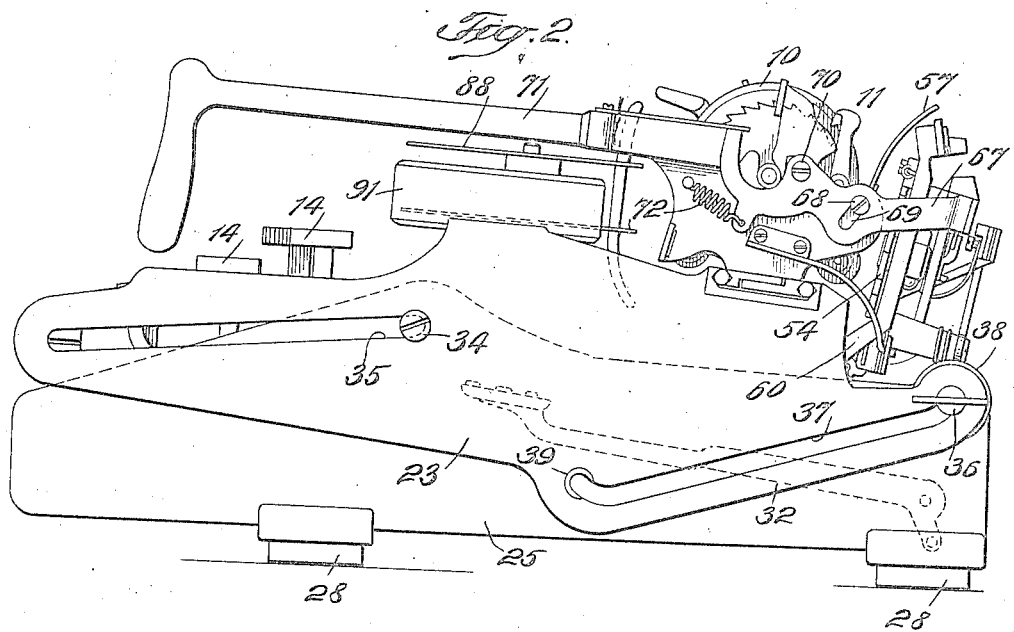
Fig. 2 is a side elevation of the machine collapsed.

As in the other application, the type-bars 13 and their key actions are mounted on a base or stationary frame part 22, while the carriage is supported by a frame, or frame part 23, which is movable relatively to the base or stationary part of the frame and the parts supported thereby for collapsing the machine. The movable frame 23 is slidably connected to the base 22. In the construction shown, the base or stationary frame part consists of parallel side plates 24 and 25 and a front cross bar 26 and may be made in one integral casting or in any desired way. The side plates are also connected by a detachable cross bar 27 upon which the key levers 18 and 19 are fulcrumed. Each side plate is provided with two sockets to receive rubber supporting feet 28 for the machine, and has two inwardly projecting bosses 29 to receive the pivots on which the shift frame 16 is mounted, and the plate 24 also has a similar boss 30 to support the pivot for the shift levers. The movable frame-part may be of any suitable construction and may consist of a substantially U-shaped, or three sided casting, having parallel side plates 31 and 32 connected near their rear ends by a cross bar 33. This frame is wider than and straddles the base 22, the overlapping side plates of the two frames being connected by a pair of screws 34 passing through slots 35 in the front ends of the plates 31 and 32 into the central portions of the plates 24 and 25, and thumb screws 36 passing through slots 37 in the rear portions of the plates 31 and 32 into the rear ends of the plates 24 and 25. The plates 24 and 25 are made with bosses 38 in which the holes for the screws are located and which serve to space the side plates 31 and 32 a short distance away from the plates 24 and 25. The ends of these bosses and the inner faces of the side plates 31 and 32 are machined to produce a sliding fit between the movable and stationary frame parts. The screws 34 are shouldered so as to hold the frame parts together without objectionable looseness and yet permit a free movement of the movable frame part 23, and the thumb screws 36 have shoulders adapted to fit into counterbored seats 39 in the ends of the slots 37 for positively locking the frame parts together against movement in any direction when the thumb screws are screwed in tightly. To collapse the machine, the thumb screws are unscrewed enough to withdraw their shoulders from the seats 39 in the front ends of the slots 37, and then the movable frame part 23 can be moved forwardly and downwardly, to the position shown in Fig. 2. If the machine is to be transported to another place, the thumb screws should be screwed home to enter their shoulders into the seats in the rear ends of the slots 37. In order to make the machine ready for use, the reverse of this operation is all that is required. By curving the ends of the slots 37 upwardly, as shown, the movable frame 23 will retain its position by gravity when the thumb screws are not screwed into locking position. By making the slots 35 and 37 inclined the movable frame is caused to move both downwardly and forwardly when the machine is collapsed, and by differently inclining the slots, as shown, the platen, which is the highest part of the machine, is lowered a greater distance than the parts in front thereof, which are not so high.

As shown, the screws 34 and 36 are seated in the side plates of the base 22 and the slots 35 and 37 formed in the side plates of the movable frame 23, but this arrangement could be reversed, or one pair of the slots and one pair of screws could be arranged in the side plates of each of the frame parts.

The invention is not restricted to the particular construction of the frames described, nor to the described means for slidably connecting them and other suitable constructions in which the frame which supports the carriage is mounted to slide on the stationary frame or base in the manner stated for collapsing the machine, could be employed.

The shift frame 17 is pivotally mounted, as described in said prior application, on the rear ends of upper and lower parallel arms 40 and 41 at opposite sides of the machine. The lower arms 41 are rigidly secured at their front ends to a rock shaft 42 near its ends and each of the upper arms 40 are pivoted at its front end to the boss 29 on the adjacent side plate of the base 22. In the present construction the upper arms 40, the upper front ends of the shift frame and also the rear ends of the rods 43, Fig. 1, that support the type bar basket (not shown) are preferably located lower than shown in said prior application to allow the rear end of the movable frame 23 to drop lower down when the machine is collapsed.

Figure 3:
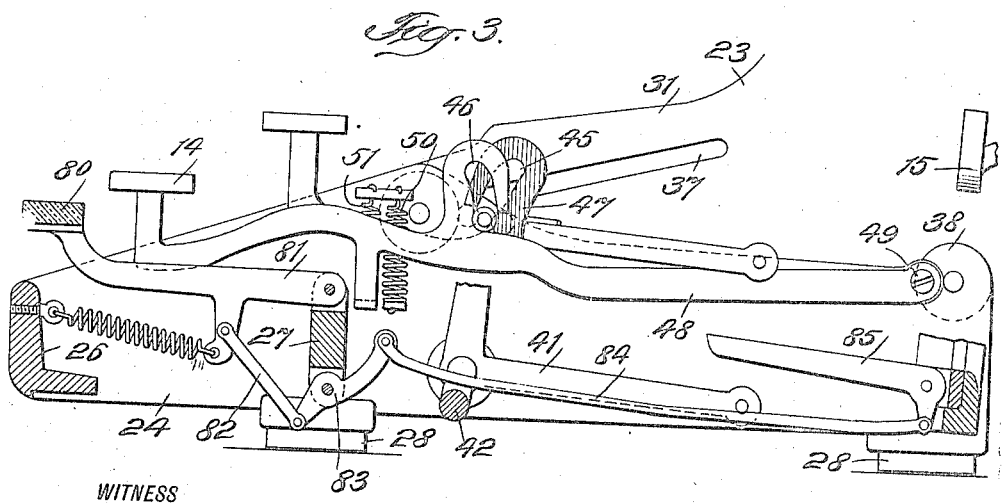
Fig. 3 is a fragmentary central longitudinal sectional elevation thereof with the parts in operative position.

For operating the shift frame the lower supporting arm 41 at the left hand side of the machine is made in the form of a bell crank, or with an upright part having at one side an anti-friction roller 44 which projects into oppositely inclined cam slots or openings 45 and 46 in two shift levers 47 and 48. These levers are arranged side by side, being suitably spaced apart and fulcrumed at their rear ends on a pivot 49 seated in the lug 30 on the side of the base 22. When the lever 47 is depressed the roller 44 is forced rearwardly and the shift frame lowered, and when the lever 48 is depressed the roller is forced forwardly and the shift frame raised. When the levers are in the normal position shown, the cams 45 and 46 engage the roller at opposite sides and positively hold it in its central position against movement in either direction, thus locking the shift frame, and to guard against wear that might permit vibration of the shift frame as it returns to the normal position from either of its shifted positions, the cam slots are curved at their lower ends to fit the roller for a considerable part of its circumference. In order to make this locking action just right, the pivotal axes of the shift levers 47 and 48 and of the arm 41 are located on lines which cross at right angles at the center of the roller 44 when it is in its normal position, and to insure the shift frame being held perfectly stationary when in either of its shifted positions, the upper ends of the cam slots are made with slight dwells, as shown in Figs. 1 and 3.

Suitable springs 50 and 51 serve to retract the shift levers and return the shift frame to the normal positions, and the weight of the segment and shift frame is preferably counterbalanced by springs 52 as usual.

The carriage escapement 53 comprises a toothed wheel 54 and a lever 55 which is connected to the upper end of the link 56 whereby it is operated by the universal bar. The escapement except as to its mounting and its relation to other parts is somewhat similar in principle to that shown in United States Patent No. 944,794, granted to me Dec. 28, 1909. The wheel and the lever are located directly in the rear of the platen and under the paper table, shown at 57, and the escapement wheel is arranged in front of the feed pinion 58, with the bearing for the escapement wheel and feed pinion located between these parts, instead of outside thereof as in the patented construction. The bearing for the escapement wheel and pinion consists of a shouldered sleeve 59 screwed into a hole in the bracket 60 and having a central rib forming a double ball race for two annular rows of balls. The escapement wheel has a conical central hole seated on the cone head of a shaft 61 and is locked thereto by screwing an inner cone 62 up against the wheel. The opposing cone is formed integrally with the feed pinion 58 and this cone and pinion are locked to the shaft by a jam nut and washer or other securing means. A bearing of any other suitable sort for the escapement wheel and feed pinion could be employed. The escapement lever 55 is located over the escapement wheel and is loosely mounted on its pivot 63, as shown in Figs. 1 and 8. Fig. 8 shows the lever in holding position with the lever forced to the right as seen in said figure, and as soon as the tooth or dog 64 of the lever 55 is released from the tooth of the escapement wheel a spring 65 acts to draw the lever to the right (left in Fig. 8), said lever 55 having a tooth or dog 66 at one end to prevent the wheel 54 escaping more than a single tooth when the lever 55 is moved for letter spacing. The object of this mounting of the lever 55 is to guard against the reengagement of the lever with the same tooth of the wheel before the carriage driving spring has overcome the inertia of the carriage and started the escapement wheel, as might happen in case a very light tensioned driving spring was used.

66 represents the rack bar with which the feed pinion meshes. The rack bar is made of a rectangular bar of substantially the length of the carriage with the rack teeth projecting downwardly from the forward portion of its lower edge. The front and rear faces of the bar are provided with opposable slots for the reception of the margin and tabulator stops, which may be of the usual or of any preferred construction. The ends of the rack bar are secured to the rear ends of supporting levers 67 which are pivotally mounted on opposite ends of the carriage, one only of said levers being shown. These levers preferably have inwardly extending rear ends which are pivoted in slots at the end of the rack bar. The levers 67 are pivoted by screws 68 or otherwise to the ends of the carriage and are provided with slots 69 concentric with their pivots in which screws or pins 68, attached to the ends of the carriage extend to limit the up and down movements of the rack bar. The forward end of the lever 67 at the right side of the machine extends under the adjacent end of the platen shaft and upwardly and outwardly in front thereof in position to be engaged and actuated by the line-space lever 71 or in any other desired manner. A spring 72 connected to the lever 67 and to the adjacent end of the carriage acts yieldingly to hold the rack bar in the normal position shown, in which it meshes with the feed pinion. The universal bar 15 is arranged to be struck by the type bars as they approach the platen and which as usual, is connected to the carriage escapement, so as to cause a letter space movement of the carriage each time a type bar is actuated to make an impression. The universal bar consists of a curved strip having two parallel rigidly connected rearwardly extending arms 73 which are pivoted to the lower ends of two pairs of downwardly extending arms 74 and 75. These arms are rigidly attached at their upper ends to the ends of a pair of parallel rock shafts 76 and 77 which are suitably journaled to lugs on the bracket 60, the latter being secured in any suitable manner to the rear cross bar 33 of the movable frame or frame part 28. One of the arms 75, see Figs. 10 and 11, has an auxiliary arm 78 pivoted thereto and extending rearwardly to a pivotal connection with the upright link 56 which is connected at its upper end to the escapement lever 55 of the carriage escapement 53, so that the escapement is actuated by the operation of the universal bar. A spring 79 connected to the arm 75 and to the bracket 60 acts to hold the universal bar yieldingly in its normal position, see Fig. 1. The universal bar is arranged above and substantially concentric with the type bar segment in position to be struck by the type bars in each of the three positions of the segment, and strike the universal bar near their longitudinal centers, it being understood that either a single or a double case shift of any desired construction may be employed.

80 represents the space key which preferably consists of a bar supported by three rearwardly extending arms 81. The middle arm 81, as shown in Fig. 3, is connected by a link 82 to the front end or arm of a lever 83 which is pivoted between its ends on the bar 27. A rod or link 84 connects the rear end of its lever to a spacing lever 85 which is pivoted preferably between the two central type bars on the fulcrum wire for the type bars. When the space key is depressed the spacing lever 85 is caused to strike the universal bar and trip the escapement just as when the type bars strike the universal bar. The space lever 85 is only of sufficient length to strike the universal bar when the segment is in its lowest position, and it normally lies horizontally, so as to be under the cross bar 33 of the movable frame 23 when the machine is collapsed.

86 represents the ink ribbon and 87 and 88 the ribbon spools, which may be of ordinary construction and are preferably of a size suitable for a full length standard ribbon one-half inch wide. The spools rest on the upper sides of inwardly extending parts 89 and 90, Fig. 6, of the movable frame 23, and these parts are preferably made with semi-circular guards 91 which surround the front and outer edges of the spools. The spool shafts 92 are journaled in bearings on the parts 89 and 90 of the frame and are provided with any suitable means for causing the spools to turn therewith. The ribbon passes from one spool to the other and is slowly wound from one spool on to the other by feed mechanism, which may be constructed as follows:

93 represents a carriage driving spring drum or motor, which, as usual, has an internal operating spring, and is connected to the carriage by a belt or cord 94. The drum is rotatably mounted under the rear cross bar 33 of the movable frame 23 and has a scroll cam 95 on its upper side which engages a pin or part 96 depending from a feed bar 97 which is seated and adapted to move parallel with the direction of travel of the carriage in a guide groove 98 in the rear cross bar 33 under the carriage track. This feed bar is provided at opposite ends with rigid portions or arms 99 which extend forwardly through wide slots 100 in the cross bar 33 and are provided at their forward ends with spring actuated pawls 101 and 102 which coöperate with ratchet wheels 103 and 104 secured to the lower ends of the spool shafts for rotating the ribbon spools. As shown, the ratchet wheels have downwardly facing teeth, and the pawls are made of sheet metal and pivoted between upturned lugs on the arms of the feed bar, being pressed upwardly toward the ratchet wheels by springs 105, Fig. 9, surrounding their pivots. When the carriage is drawn to the right to start a new line the cam on the spring drum 93 forces the feed bar 97 to the left, and as the line is being written the cam and pin move the feed bar in the opposite direction, thus reciprocating the bar and the feed pawls 101 and 102. The bar 97 has a step-by-step movement in sequence with the travel of the carriage but to a less extent and is restored to its starting position as the carriage is moved backward in a direction opposite its letter spacing movement. The feed pawls are controlled by a feed reversing mechanism which holds one pawl out of action, while permitting the other pawl to engage and turn its ratchet wheel. One spool is thus rotated intermittently and feeds the ribbon in one direction. When the ribbon is nearly unwound from one spool, feed reversing mechanism operates to throw the active pawl out of action and place the other pawl into action to cause the ribbon to be wound on the other spool and fed in the opposite direction. 106 and 107 represent two spring-pressed dogs which are pivoted underneath the frame parts 89 and 90 and act to prevent backward motion of the ratchet wheels during the return strokes of the feed pawls.

The feed reversing mechanism has two reversing levers 108 and 109 which are suitably pivoted at their rear ends under the frame cross bar 33 to swing horizontally. These levers have upright front portions adjacent to the ribbon spools provided with guide slots 110 through which the ribbon passes, and the ribbon is provided near each end with an obstruction 111 adapted to engage and move the adjacent reversing lever. The levers are caused to swing together by a connecting bar 112 which extends across the machine in front of the carriage and is pivoted to the reversing levers, and springs 113 connected to the levers and to the supporting frame assist in shifting the levers. These springs are arranged to swing across the pivotal axes of the levers during the movement of the levers and operate to complete the movement of the levers in both directions and to hold them in either position to which they are shifted.

114 and 115 represent pawl controlling plates which are suitably pivoted to the frame or frame part 23 and extend adjacent to the edges of the ratchet wheels. Each plate extends over lateral projections on the feed pawl and holding dog for the adjacent ratchet wheel and is adapted, when depressed by a spring 116 surrounding its pivot, to lower and hold the pawl and dog out of engagement with the ratchet wheel. The plates 114 and 115 are connected to the upper ends of toggle joints 117 and 118 respectively, which are connected at their lower ends to fixed pivots 119, supported below the frame 23. The knuckle pin of the toggle joint 117 extends between two lugs or fingers 120 and 121 on the adjacent end of the connecting bar 112 and the knuckle pin of the other toggle joint 118 extends between corresponding lugs 123 and 124 on the opposite end of the connecting bar, see Figs. 6 and 9.

In the position of the parts shown in the drawings the toggle joint 117 is straightened and holds the pawl controlling plate 114 up off of the pawl and dog for the ratchet wheel 103, while the other toggle joint is bent, permitting the plate 115 to hold the pawl and dog down out of engagement with the ratchet wheel 104. When the toggle joints are straightened they are moved slightly beyond a dead center position, so as to be retained in this position and hold the controlling plates up by the pressure of the plates thereon. The pawl 101 is then active and turns the ratchet wheel 103 to wind the ribbon on the left hand spool 87. When the ribbon is nearly unwound from the right hand spool 88, as shown, the obstruction 111 on the right hand end of the ribbon engages and moves the reversing lever 109. As soon as the lever is moved past its central position the springs 113 act to throw the reversing levers 108 and 109 and connecting bar 112 quickly to the left, and the lug 121 on the bar strikes and breaks the toggle joint 117 while the projection 124 strikes and straightens the toggle joint 118. The plate 114 is thus lowered and throws the pawl 101 and companion holding dog 106 out of action and the plate 115 is raised, permitting the pawl 102 and companion dog 107 to come into action. The right hand spool 88 will then be turned and wind the ribbon thereon until the obstruction on the other end of the ribbon strikes and similarly operates the reversing lever 108 to again reverse the feed of the ribbon.

The pair of lugs 120 and 121 and the pair of lugs 123 and 124 on the connecting bar 112 are spaced so as to allow lost motion and permit the reversing levers to move past their central positions before the lugs act on the toggle joints 117 and 118 and the toggle joint that is on the dead center retains that position until suddenly forced off center by same movement of the bar 112 that forces the other joint on to the dead center position. The feed reversing mechanism is thus operated by a slight pull on the ribbon and acts quickly and positively, and the described construction overcomes the well known fault of a point where both spools are connected to the feed mechanism, or where neither spool is so connected.

The described mechanism turns both spools in the same direction, the ribbon passing around one spool from the rear and around the other from the front. As the reversing levers are in the same relation to the spools there is slightly more strain on the ribbon when reversing from one direction than from the other, but the strain is not sufficient to be objectionable, and the construction makes a most compact, efficient and inexpensive ribbon feeding and feed reversing mechanism.

125 represents a ribbon guide or vibrator for vibrating the ribbon to and from the printing position in front of the printing point on the platen. The vibrator, which may be constructed and mounted to reciprocate in any suitable manner is actuated by a vibrator lever 126, to which it is detachably connected, for instance, by a projection on the lower end of the vibrator entering a notch in the front end of the lever. The vibrator lever is suitably pivoted at its rear end, on the under side of the bracket 60 and is connected, at different distances from its pivot, by links 127 and 128, respectively to rock-arms 129 and 130 of different lengths. These rock-arms are loosely pivoted on the rock shaft 76 which supports and is rocked by the universal bar 15. One or the other of these arms 129 and 130 is adapted to be connected with the rock shaft 76, so as to rock therewith for producing a longer or a shorter throw of the vibrator. For this purpose the arms 129 and 130 are arranged in slots in a block 131 which is rigidly secured on the rock shaft 76. The arms and block are provided with transverse holes which register when the vibrator lever is in the normal or rest position. 132 and 133 represent two slides arranged to slide on the rock shaft 76 at opposite sides of the block 131 and are provided with pins 134 and 135 projecting therefrom into the hole in the block 131. In the position of the slides, shown in Fig. 12, the pin 135 extends through the hole in the short rock arm 129 and the other pin is withdrawn from the hole in the long rock arm 130. The short arm will then be connected to the rock shaft 76 and produce a short throw of the vibrator appropriate for using the upper position or field of the ribbon. By moving the slides 132 and 133 to the right the pin 135 will be withdrawn from the hole in the short arm 129 and the other pin 134 will be moved into the hole in the long arm 130 and connect this arm to the rock shaft. The throw of the vibrator will then be increased sufficiently for using the lower portion or field of the ribbon. The slides 132 and 133 have tubular extensions 136, Fig. 12, to limit their movement on the rock shaft 76, and have extensions 137 which meet in front of the block 131. A detent spring 138 secured to the arm 74 is adapted to snap into notches in the extensions 137 to hold the slides in position to connect either the rock-arm 129 or the arm 130 with the rock shaft.

139 represents a bar for shifting the slides 132 and 133 to change the throw of the vibrator lever. This bar is slidably mounted on the bracket 60, for example, by two screws or bolts passing through slots in the bar, and has upwardly extending fingers, 140 and 141 adapted to engage and move the slides 132 and 133. The bar 139 is connected by a link or rod 142 to an operating lever or key 144 which is fulcrumed at one side of the frame 23 and extends forwardly to a point where it can be conveniently operated. The link 142 is slidably mounted, for instance, by a screw 145 passing through a slot therein into the frame bar 33, and has a pin 146 entering a hole in the slide bar 139, or is otherwise detachably connected to the bar, so as to permit the bar to be detached from the machine with the bracket 60. By moving the front end of the key lever 144 to the left as far as it will go, the slide bar 139 will withdraw the pin 135 from the arm 129 and move the pin 134 into the arm 130, and the lower field of the ribbon will thus be brought into use. A depending central lug 147 on the slide bar 139 acts, when the upper field is in action, to limit the upward movement of the vibrator lever to the exact distance required. The body of the slide bar is of the proper width to similarly limit the movement of the lever when the lower field is in action. This overcomes a quite common fault, as after some wear on the pivots of the vibrating mechanisms in general use, the ribbon is often thrown too high.

The slide bar 139 is adapted to move considerably farther than is necessary to effect the change in the field of the ribbon, the object of this being to permit the key lever 144 to be placed in a central position and the slide 133 moved by hand to withdraw the pin 135 from the arm 129 and the pin 134 from the arm 130 to disconnect the vibrator lever from the control of the universal bar, and thus silence the vibrator. When it is desired to restore the vibrator to action the movement of the key lever 144 to the right for the upper field, or to the left for the lower field, is all that is necessary. The described construction of the vibrating mechanism provides for the use of a bichrome ribbon, and for stencil work without removing the ribbon, and all within the very small space available in a collapsible typewriter.

It will be observed that the entire mechanism for feeding the ribbon reversing the feed and vibrating the ribbon is mounted on the movable frame 23 and is constructed so as to be exceedingly compact and so as not to interfere with the collapsing of the machine. When the movable frame 23 is lowered the type bar segment extends up between the ribbon spools, which are located in front of the carriage, and the ribbon operating mechanism descends to a position in rear of the segment. While the mechanism is thus especially adapted for a collapsible typewriter of the construction mentioned, it will be evident that it is also applicable to non-collapsible machines. The preferred construction of the mechanism has been described, but this construction can be changed in various details without departing from the spirit of the invention. For instance, the sliding feed bar can be connected to the driving motor and to the spools in other ways, and the ribbon reversing levers can be differently arranged. Also means of other construction can be used for changing the throw of the ribbon vibrator.

Having thus described my invention, I claim as new and desire to secure by Letters Patent:—

1. In a typewriting machine, the combination of a two-part frame having one part movable relative to the other and slidably held thereon, a platen carriage, escapement mechanism, ribbon mechanism including means for vibrating a ribbon and for feeding the same lengthwise, all mounted upon the movable part of the frame, and printing instrumentalities mounted upon the other part of the frame to adapt said printing instrumentalities and platen carriage to be brought into closer relation to make the machine compact when not in use.

2. In a typewriting machine, the combination of a two-part frame having one part movable relative to the other and slidably held thereon, a platen carriage, and ribbon mechanism mounted upon the movable part of the frame, and printing instrumentalities mounted upon the other part of the frame.

3. In a typewriting machine, the combination of a two-part frame having one part movable relative to the other and slidably held thereon, a platen carriage, escapement mechanism, ribbon mechanism including means for vibrating a ribbon and for feeding the same lengthwise, all mounted upon the movable part of the frame, and a keyboard mounted upon the other part of the frame.

4. In a typewriting machine, the combination of a two-part frame having one part movable relative to the other and slidably held thereon, a platen carriage, escapement mechanism, ribbon mechanism including means for vibrating a ribbon and for feeding the same lengthwise, and a universal bar all mounted upon the movable part of the frame, a keyboard mounted upon the other part of the frame, and type adapted to be moved toward the platen carriage as each key is depressed.

5. In a typewriting machine, the combination of a frame having relatively slidable parts adapted to move one within the other fore and rear of the machine to shorten its length in one position thereof, a platen carriage, escapement mechanism, ribbon instrumentalities, and a universal bar all mounted upon the movable part of said frame, and a keyboard mounted on the other part of said main frame, said keyboard, carriage, escapement mechanism, ribbon instrumentalities all maintaining an upright position while in a normal operative position and while the parts are moved relatively to shorten the machine and make the same compact.

6. In a typewriting machine, the combination of a frame having relatively slidable parts adapted to move one within the other fore and rear of the machine to shorten its length and reduce its height in one position thereof, a platen carriage, escapement mechanism, and ribbon instrumentalities all mounted upon the movable part of said frame, and a keyboard mounted on the other part of said main frame, said keyboard, carriage, escapement mechanism, ribbon instrumentalities all maintaining an upright position while in a normal operative position and while the parts are moved relatively to make the machine compact.

7. In a typewriting machine, the combination of a frame having relatively slidable parts adapted to move one within the other fore and rear of the machine to shorten its length in one position thereof, a platen carriage, escapement mechanism, and ribbon instrumentalities all mounted upon the movable part of said frame, a keyboard mounted on the other part of said main frame, and a type-bar for each key adapted to be located under the carriage when the parts are moved to a compact position.

8. In a typewriting machine, the combination of a frame having two relatively slidable parts substantially rectangular in form and slidably held together to shorten the length and height of the machine and reduce the cubical dimension thereof, one of said parts being normally stationary and both parts of the frame being maintained in an upright position at all times, a keyboard, a case shift, type-bars, and spacing means all mounted upon the movable part of the frame, and a platen carriage, escapement mechanism, ribbon instrumentalities, and a universal bar mounted upon the other part of said frame to adapt said parts to be moved relatively to each other and place the carriage over the type-bars and in an inoperative position.

9. In a typewriting machine, the combination of a frame having two relatively slidable parts substantially rectangular in form and slidably held together to reduce the cubical dimension thereof, one of said parts being normally stationary, and both parts of the frame being maintained in an upright position at all times, a keyboard, type-bars, and spacing means all mounted upon the movable part of the frame, and a platen carriage, escapement mechanism, and ribbon instrumentalities mounted upon the other member of said frame to adapt said parts to be moved relatively to each other.

10. In a typewriting machine, the combination of a base frame part, case shift mechanism mounted upon said base part, a keyboard also mounted upon said base part, type-bars operatively connected to the keyboard and also mounted on said base part, a main frame part adapted to fit about the base part, means for slidably holding the main frame part to the base part to adapt said frame part to be extended upwardly and rearward in normal operative position and while upright and to be forced forward and downward to collapse the machine and to shorten its length and reduce the height thereof, a platen carriage mounted upon the main frame part, ribbon instrumentalities, escapement mechanism, and means for operating the escapement mechanism, all mounted upon said main frame part.

This specification signed this 27th day of March A. D. 1916.

EMMIT G. LATTA.